Figure 1:
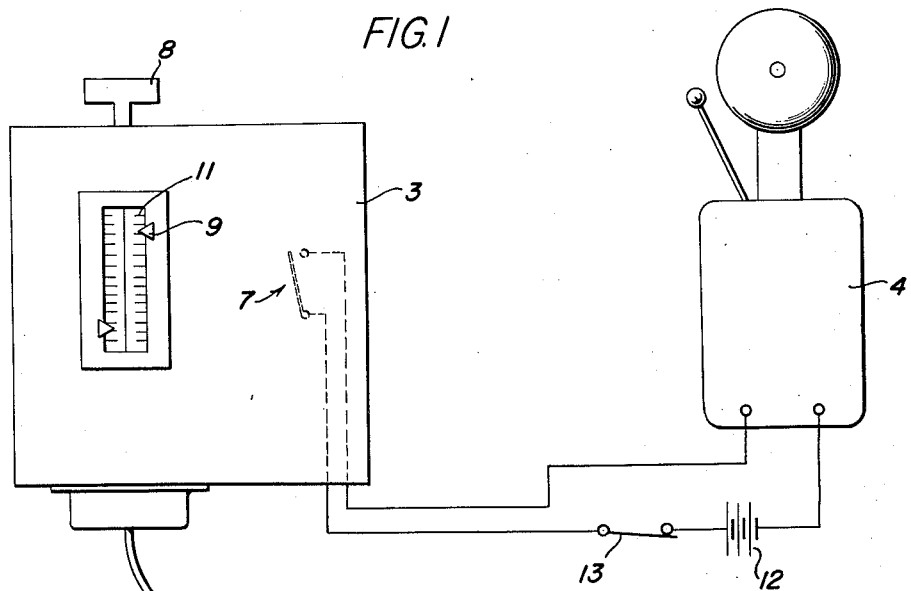

Jan. 17, 1961 P. SPIRO 2,968,275
REFRIGERATION ALARM SYSTEM
Filed Jan. 15, 1959

INVENTOR.
PHILIP SPIRO
BY Hurvitz & Rose
ATTORNEYS

2,968,275

United States Patent Office

Patented Jan. 17, 1961

2,968,275

REFRIGERATION ALARM SYSTEM

Philip Spiro, 765 Post Ave., Staten Island 10, N.Y.

Filed Jan. 15, 1959, Ser. No. 787,005

4 Claims. (Cl. 116—102)

The present invention relates to alarm systems and more particularly to a system for producing an indication of the malfunctioning of a refrigeration apparatus which is periodically automatically defrosted.

In the field of refrigeration and in particular, in that branch of refrigeration relating to automatically defrosted freezer compartments, difficulty arises in providing suitable alarms for indicating malfunctioning of the system since the temperature within the compartment rises considerably, often as high as 50 to 55 degrees, during the intervals of automatic defrosting of the unit. In one class of malfunction alarms now employed, an alarm is sounded or a visual indication is produced when the temperature within the compartment rises above a predetermined minimum, which minimum is also usually exceeded during a defrost interval. Consequently, an attendant must determine, upon the sounding of the alarm, whether there is a true malfunction of the apparatus or whether the mechanism is merely going through a defrost cycle.

A second class of alarm systems which are known utilize a temperature detection instrument having a predetermined thermal inertia with respect to the thermal inertia of the goods disposed within the compartment. More particularly, the thermal inertia of the detection unit is slightly less than the thermal inertia of the specific goods disposed within the compartment and when the temperature of the detection unit rises above a predetermined limit an alarm is sounded indicating that the temperature of the box is rising dangerously close to the maximum allowable limit with regard to the particular substance within the box. Such a system has numerous difficulties but perhaps the most apparent is the fact that, for each type of goods to be protected, the detection unit must be altered since the thermal inertia of each of the various types of goods is different. Also, such a system prevents the mixing of goods having widely different thermal inertias. A further difficulty with such systems is that where relatively large bodies are being refrigerated the detection unit ordinarily has a large volume in order to have a thermal inertia only slightly below that of the bodies being protected.

In accordance with the present invention, there is provided an alarm system for automatically defrosted refrigeration apparatus which system has a delayed response to defrosting of the unit and the delay of response is sufficiently long so that the alarm is not actuated during normal defrosting intervals. More particularly, the present invention utilizes a sensing unit filled with a liquid having a predetermined freezing point which is greater than the normal temperature maintained in the freezing unit so that it is frozen during normal operating cycles. The freezing point is above the normal operating temperature in the compartment but below the temperature attained in the compartment during the defrost interval so that the liquid tends to melt during defrosting of the unit. However, the latent heat of melting of the liquid is such that the liquid does not melt completely during normal defrosting intervals. The alarm responds only to a rise in temperature of the liquid above its melting temperature and since the liquid does not become completely melted during a defrost interval, its temperature cannot rise above its melting temperature. In consequence, during normal defrost intervals, the alarm is not sounded. If the freezer unit is malfunctioning, the temperature of the compartment will remain above the melting temperature of the liquid for the interval required for the liquid to absorb its latent heat of melting. The liquid will then melt completely, its temperature will rise above its melting point and then the alarm will be sounded. It is to be noted that the unit does not measure temperature but primarily measures times. Actually the unit is sensitive to both temperature and time since that rate at which the liquid absorbs its heat is a function of the difference in temperature between the liquid and its environment. However, the rate at which the temperature in the freezer unit rises when the refrigeration apparatus ceases to operate is determinable and therefore the average value of the temperature in the box over a given period of time may be determined. With this knowledge, the latent heat of the liquid required to provide a prescribed time delay may readily be calculated and may be made large enough to insure that complete defrosting occurs only after the refrigeration unit has been inoperative for a period in excess of the normal defrost cycle.

The apparatus may be employed in several environments and for instance may be employed in deep storage freezers. In such an installation the sensing unit may be disposed anywhere within the box or unit and preferably should be disposed in that location which normally heats up the most rapidly. If the unit is to be employed in freezer cabinets where the doors are being repeatedly opened and therefore the temperature within the cabinet fluctuates irradically, the detector unit may preferably be mounted in contact with the freezer coils and thawing of the detector unit can start only after complete defrosting of the freezer coils in the region of contact of the detector unit. Thus, the unit is completely flexible and may be employed in any type of freezer apparatus. Since the detector unit is employed primarily to introduce a predetermined time delay between temperature rises in the unit and the sounding of the alarm, the unit is not in any way dependent upon the type of materials being refrigerated. The only limitation upon the liquid within the detector unit other than the requirement that its latent heat be such as to produce the prescribed time delay, is that its melting point lie between the normal temperature within the cabinet and the defrost temperature. Therefore, the composition of the liquid is not critical and any given detector unit may be employed in a wide variety of environments. As an example of the liquid which may be employed, a mixture of glycerine or similar liquid and water may be utilized in order to provide a liquid having the desired freezing temperature and the desired latent heat of melting.

In a specific embodiment of the present invention, a copper tube of approximately six inches in length and half an inch in internal diameter is filled with a mixture of water and glycerine and sealed at both ends. A temperature sensing element is secured to the copper tube either internally or externally thereof and this unit makes or breaks an alarm circuit in accordance with the temperature detected. The unit is adjusted such that the alarm circuit is maintained open until the temperature to which the temperature sensing element is subjected, rises above the freezing temperature of the liquid within the copper tube. The size of the copper tube is primarily determined by the quantity of liquid required to provide the necessary time delay. By employing a relatively dense liquid such as glycerine having a high latent heat, the quantity of liquid required in most installations is quite small and therefore, the size of the unit is small. Further, the temperature characteristics of most freezers of comparable sizes do not vary greatly and a liquid unit of a given size may be used in a wide variety of different installations.

It is an object of the present invention to provide an alarm system for automatically defrosted freezer apparatus which responds primarily to an extended defrost interval to initiate an alarm.

It is another object of the present invention to provide an automatic alarm system for use with periodically defrosted freezer compartments, in which the operation of the alarm system is delayed by an interval determined by the time required for a liquid to absorb its latent heat of melting.

It is still another object of the present invention to provide an automatic alarm system for periodically defrosted freezer apparatus, which alarm is actuated only after a liquid in a detector element has absorebd its latent heat of melting and its tempearture rises above its freezing temperature.

Figure 2:
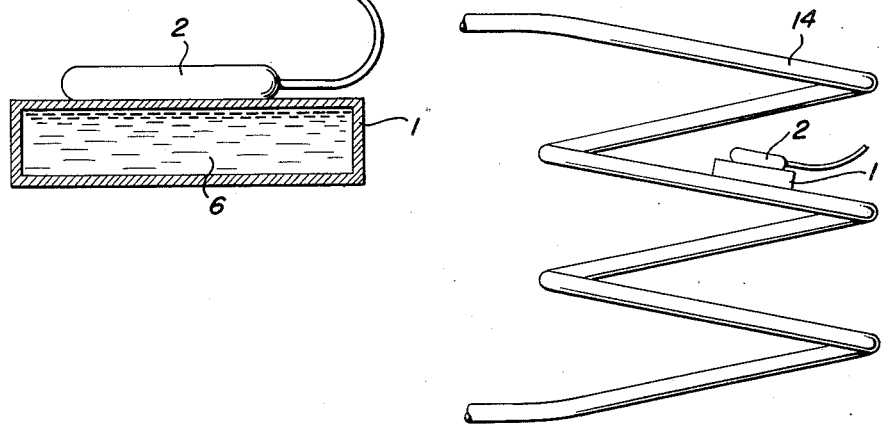

The above and still further objects, features and advantages of the present invention will become apparent upon consideration of the following detailed description of one specific embodiment thereof, especially when taken in conjunction with the accompanying drawings, wherein:

Figure 1 is a schematic diagram illustrating the basic elements of the system of the invention and their interconnection; and Figure 2 is a diagram illustrating the application of the instrument to the coils of a freezer cabinet.

Referring specifically to Figure 1 of the accompanying drawings, there is illustrated an alarm unit of the present invention which includes as its basic elements, a heat responsive unit 1, a temperature sensing element 2, a thermal responsive switching system 3, and an alarm 4, which is illustrated for purposes of example as a bell. The heat responsive unit 1 comprises a hollow metallic shell, fabricated from a suitable thermally conductive metal such as copper, filled with a liquid 6 having predetermined characteristics. More particularly the liquid 6 may comprise water or preferably a mixture of water and glycerine or similar substance, the relative quantities of which are chosen to provide a liquid having a predetermined latent heat of melting which accords with characteristics generally determined by the type of apparatus with which the system is to be employed. The temperature of the unit 1 is measured by the temperature sensing element 2 which produces pressure variations within the temperature switching unit 3 in order to close a switch 7 when the temperature of the unit 1 rises above a predetermined temperature. The switching temperature of the unit 3 is selected by a mechanism controlled by an external knob 8. The specific temperature at which the switch 7 is closed is indicated by a pointer 9 operating on a scale 11. A suitable apparatus which may be employed for the unit 3 is manufactured by Ranco, Inc. and is designated as Type 010. The unit 3 may also employ a temperature sensing apparatus of the type illustrated in U.S. Patent No. 2,537,431, including elements 34, 36, 38 and 40. The bulb 2 may be filled with a volatile liquid which creates a vapor pressure within an expansible chamber disposed in the temperature switching unit 3. Thus, upon melting of the material in the member 1, a vapor pressure is created in the bulb 2 which expands the expansible chamber in unit 3 and closes switch 7.

The switch 7 is included in a series electric circuit including the operating coil of the bell 4, a battery 12 and a switch 13. The switch 13 is normally closed during operation of the system but may be opened when it is desired to de-energize the alarm. When the temperature of the unit 1 rises sufficiently to close the switch 7, the alarm circuit is completed and the alarm 4 is energized.

In normal operation of the system the fluid 6 is chosen to have a freezing point somewhat below the freezing temperature of water but above the temperature at which the freezing unit in which it is to be installed is normally maintained. Further, the freezing temperature of the liquid 6 is below the temperature at which the freezing compartment arrives during defrosting. Therefore, if the unit responded immediately to temperature changes, the alarm would be given each time the freezer is defrosted by automatic means. In accordance with the present invention, the latent heat of the liquid 6 is chosen such that the liquid 6 does not completely melt during the total defrost interval of the apparatus. Upon defrosting of a freezer compartment the temperature rises sometimes to as high as 50 to 55 degrees and if the alarm unit were merely temperature sensitive, the alarm would be sounded every time the apparatus was defrosted. However, if the interval required for the fluid 6 to absorb its total latent heat of melting is greater than the interval of a defrost cycle then the alarm does not sound. This interval is defined at its starting point by the time at which the temperature in the box rises above the freezing point of liquid 6 and terminates when complete defrosting has been achieved and the temperature within the freezer compartment has again been reduced below the freezing temperature of the liquid 6. Obviously these times vary with the size of the freezer unit with which the system is to be incorporated and therefore a single unit 1 cannot serve for all sizes of compartments. However, the unit 1 can serve over relatively widely varying size limits and further, by making the bulb 2 removable from the unit 1 the system may be readily converted to the particular unit with which the apparatus is being employed by utilizing a different size bulb or a bulb filled with a different fluid mixture. The limit of range of any particular unit 1 is determined primarily by the characteristics of the fluid 6 and if the latent heat of melting of the fluid 6 is quite large, a single unit 1 may be employed with freezers of widely varying sizes.

If there is a malfunction of the apparatus, then the interval required for the liquid 6 to melt completely is exceeded and once it has completely melted its temperature begins to rise. The rise in temperature of the liquid 6 above its freezing temperature is immediately detected by the apparatus 3 in order to sound an alarm and therefore produce an indication of a malfunction of the apparatus. Thus, it is seen that the unit 6 does not measure temperature per se but primarily depends upon a predetermined time delay in sounding the alarm.

As previously indicated, the placement of the unit 6 within the freezing compartment depends upon the type of system with which the apparatus is to be employed. Thus, if the apparatus is to be employed with large storage freezers, the unit 1 may be placed anywhere within the compartment and primarily should be removed from the freezing coils. However, when the apapratus is employed with relatively small refrigerated cabinets where opening and closing of the doors can cause relatively large fluctuations in the internal temperature of the cabinet the unit 1 should be placed in contact with the freezing coils and this situation is illustrated in Figure 2 of the accompanying drawings.

Referring specifically to Figure 2, the reference numeral 14 is applied to an apparatus indicating the freezing coils of a refrigerated cabinet and the reference numeral 1 is applied to the detector unit illustrated in greater detail in Figure 1. The bulb 2 is placed in contact with the unit 1 and the unit 1 is in contact with the coils 14. In such a situation when the frost line of the coils recedes completely from the unit 1 the unit is exposed to the surrounding air which by this time has risen above the freezing temperature of the fluid within the sensing unit 1. After a normal defrost interval, the temperature of the coils 14 is reduced to a value below the freezing temperature of the liquid in the container 1 and for the system to operate properly the delay in complete thawing of the liquid must be greater than the interval between the recession of the frost line from the unit 1 and the re-establishment of a freezing temperature therein.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. A refrigerated compartment intended to be periodically defrosted, an alarm system insensitive to increases in temperature attributable only to intentional defrosting of the compartment, said alarm system comprising a heat responsive means disposed in said compartment, alarm means, temperature sensing means operably associated with said heat responsive means and said alarm means, said sensing means actuating said alarm means in response to a rise in temperature of said heat responsive means above its freezing point, said heat responsive means having a freezing point above the normal temperature of the refrigerated compartment and below the final defrost temperature of said compartment, said heat responsive means having a mass and latent heat of fusion such that the time required for said heat responsive means to absorb its total latent heat of fusion is greater than the normal defrosting interval of said compartment.

2. The combination according to claim 1 wherein said heat responsive means comprises a metallic container and a liquid disposed in said container.

3. The combination according to claim 2 wherein said liquid contains at least glycerine.

4. The combination according to claim 1 wherein said temperature sensing means comprises a bulb in contact with said heat responsive means, said bulb producing a variation in pressure internally thereof in response to changes in temperature of said heat responsive means.

References Cited in the file of this patent

UNITED STATES PATENTS

| | | |
|---|---|---|
| 1,719,851 | Raney | July 9, 1929 |
| 2,208,267 | Ridge | July 16, 1940 |
| 2,537,431 | Stickel | Jan. 9, 1951 |